(12) United States Patent
Lange

(10) Patent No.: US 6,523,460 B1
(45) Date of Patent: Feb. 25, 2003

(54) SKILLET WITH INTERCHANGEABLE PERFORATED BOTTOM PLATES

(76) Inventor: Rita T. Lange, Rte. 2, Box 216-27, Crane, MO (US) 65633

( * ) Notice: Subject to any disclaimer, the term of this patent is extended or adjusted under 35 U.S.C. 154(b) by 0 days.

(21) Appl. No.: 09/918,903

(22) Filed: Jul. 31, 2001

(51) Int. Cl.[7] ............................... A47J 27/00
(52) U.S. Cl. .............................. 99/340; 99/444; 99/450
(58) Field of Search ................... 99/425, 422, 418, 99/415, 444, 446, 450, 449, 340; 126/9 R, 275 R

(56) References Cited

U.S. PATENT DOCUMENTS

| | | | | |
|---|---|---|---|---|
| 62,437 A | * | 2/1867 | Page | ............................ 99/450 |
| 127,900 A | * | 6/1872 | Lee | ............................ 99/450 X |
| 1,899,682 A | * | 2/1933 | Goldenberg | .............. 99/450 X |
| 2,135,782 A | * | 11/1938 | McBirney | ..................... 99/450 |
| 4,173,179 A | | 11/1979 | Arthur | |
| 4,176,591 A | | 12/1979 | Power | |
| 4,352,324 A | | 10/1982 | Noh | |
| 4,565,122 A | | 1/1986 | Feuillalay | |
| 5,467,696 A | | 11/1995 | Everhart | |
| 5,584,236 A | | 12/1996 | Margolis | |
| 5,884,555 A | | 3/1999 | Chang | |
| 5,974,953 A | * | 11/1999 | Messerli | .................... 99/450 X |
| 6,196,115 B1 | * | 3/2001 | Tsao | ......................... 99/450 X |

* cited by examiner

Primary Examiner—Reginald L. Alexander
(74) Attorney, Agent, or Firm—Dale J. Ream

(57) ABSTRACT

A skillet with interchangeable bottom plates includes a side wall having upper and lower edges. A ledge is fixedly attached to the lower edge and extends inwardly to form a substantially open bottom. The skillet includes a plurality of interchangeable bottom plates, each plate being dimensioned to be selectably positioned atop the ledge and surrounded by the side wall. The ledge and bottom plates include complementary tab and groove combinations so that rotary motion of a plate is precluded when positioned atop the ledge. Each plate includes a cooking surface having a different configuration of apertures for selective use in cooking different types and sizes of food items over a cooking grill.

6 Claims, 5 Drawing Sheets

SKILLET WITH INTERCHANGEABLE PERFORATED BOTTOM PLATES

BACKGROUND OF THE INVENTION

This invention relates generally to an outdoor cooking apparatus and, more particularly, to a skillet having interchangeable perforated bottom plates for directly exposing food items to the heat and fire of a cooking grill while cooking.

Skillets have long been used for cooking food items over a campfire or an outdoor cooking grill. One problem with conventional skillets is that food items such as bacon, eggs, etc. get cooked in their own grease as there is no effective means for draining it while cooking. Having a skillet full of flammable grease so near an open flame is also hazardous. Another problem with using conventional skillets for outdoor cooking is that the skillet may inhibit efficient heat transfer or the desired flavoring that results from more direct contact between the food items and the fire or smoke.

Various devices have been proposed in the art for draining and collecting grease from a skillet. Although assumably effective for their intended purposes, the existing devices do not provide a skillet having means both for draining grease while cooking and for cooking virtually any sized food items with direct exposure to an open flame or the direct heat of an outdoor cooking grill.

Therefore, it is desirable to have a skillet with interchangeable perforated bottom plates for cooking food items in direct exposure to a flame or cooking grill. Further, it is desirable to have a skillet in which variably sized food items can be cooked in direct exposure to a flame or grill without the food items falling out of the skillet.

SUMMARY OF THE INVENTION

A skillet having interchangeable bottom plates according to the present invention includes a side wall having a lower edge. A rim with an inwardly extending ledge portion is attached to the lower edge of the side wall and extends therealong. The rim extends inwardly a short distance from the lower edge of the side wall and defines an open bottom of the skillet. The skillet includes a plurality of interchangeable bottom plates with each plate being dimensioned to be supported atop the ledge and thus surrounded by the side wall. Each bottom plate includes a cooking surface having a unique configuration of apertures. For example, a cooking surface of one plate may include a grate having relatively large diamond-shaped apertures while another plate may include a cooking surface having relatively small circular apertures. Therefore, meat, potatoes, large vegetable portions, small vegetable portions, etc. may be cooked in the skillet when the appropriate bottom plate is used.

Therefore, a general object of this invention is to provide a skillet having a perforated bottom plate which reduces cooking time by exposing food items to the direct heat of an open flame or cooking grill.

Another object of this invention is to provide a skillet, as aforesaid, having a plurality of removable and interchangeable bottom plates such that a bottom plate having apertures appropriately suited for a particular food size may be used.

A further object of this invention is to provide a skillet, as aforesaid, having an inwardly disposed ledge for selectively supporting an interchangeable bottom plate.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
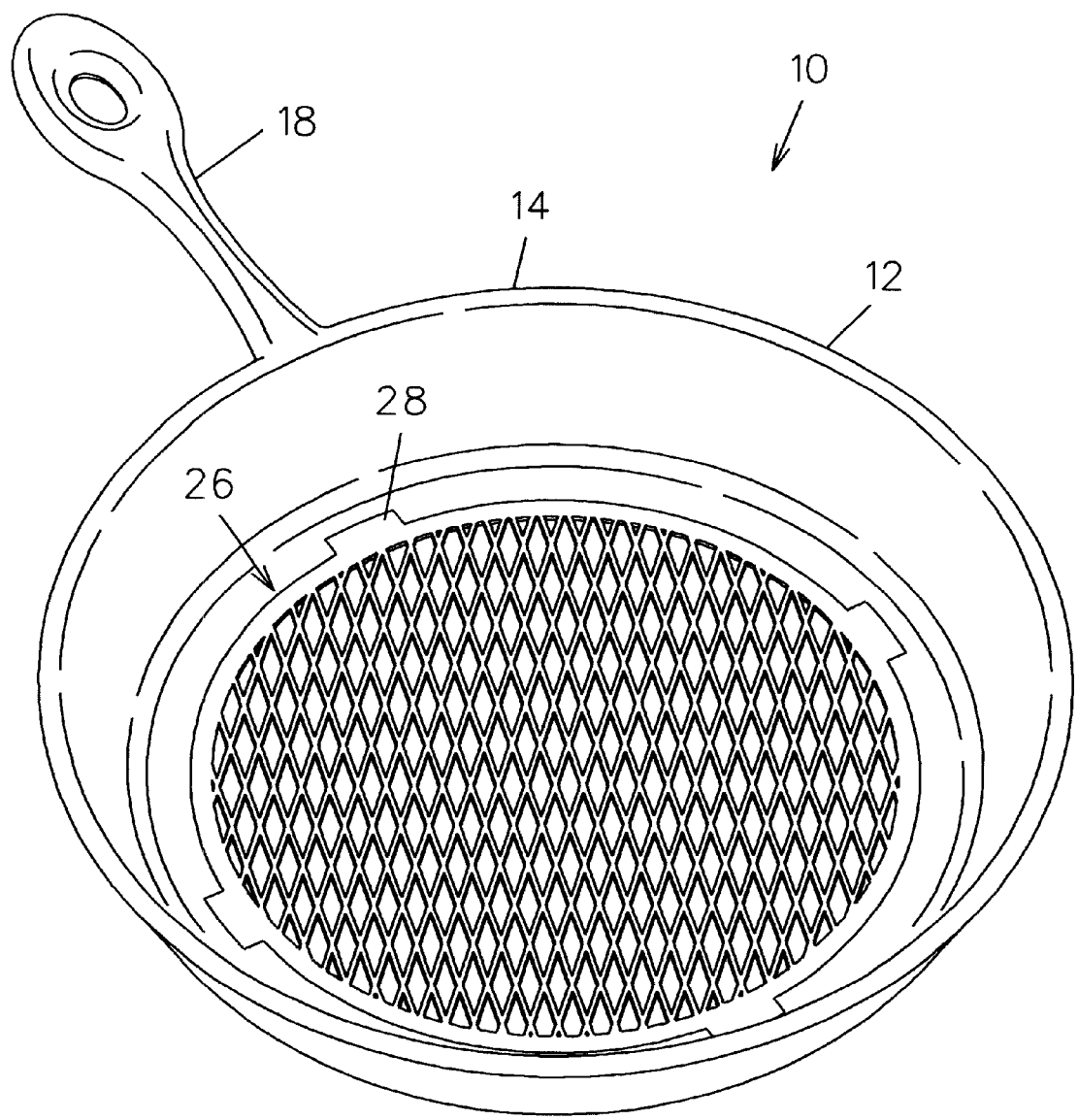
FIG. 1 is a perspective view of a skillet according to a preferred embodiment of the present invention.
Figure 2:
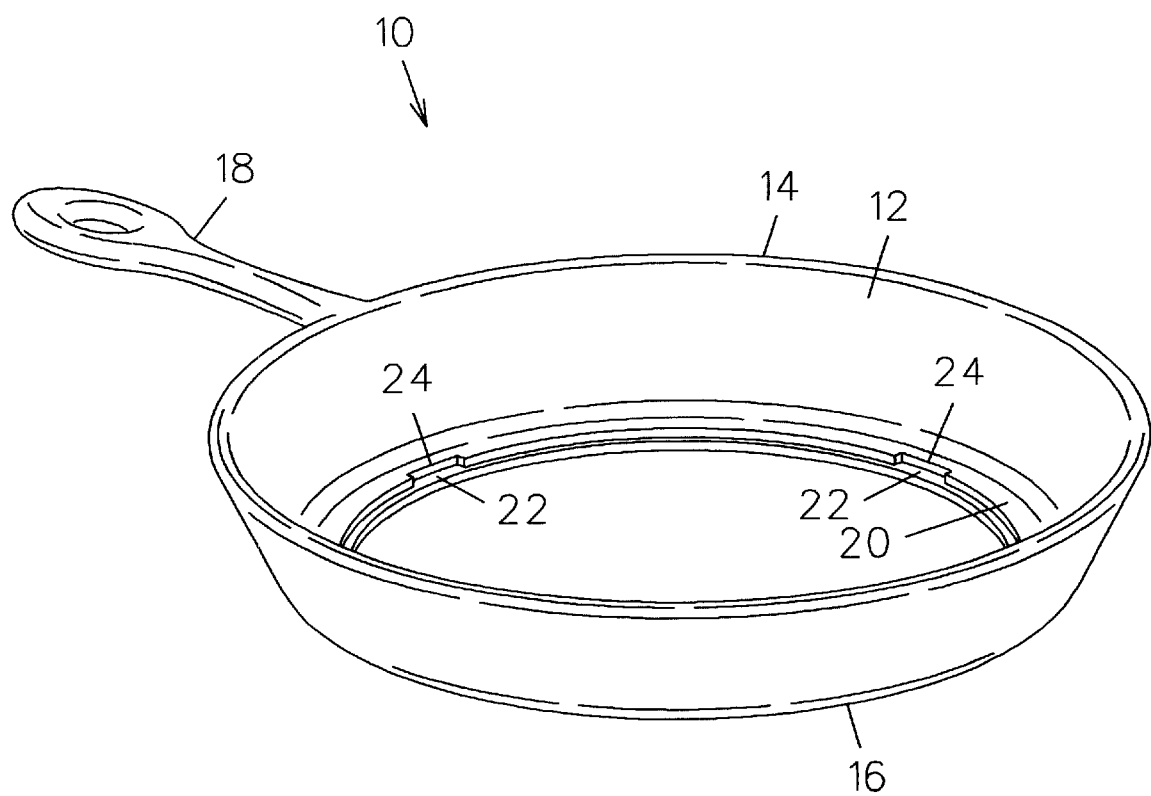
FIG. 2 is another perspective view of the skillet as in FIG. 1 with the bottom plate removed.
Figure 3:
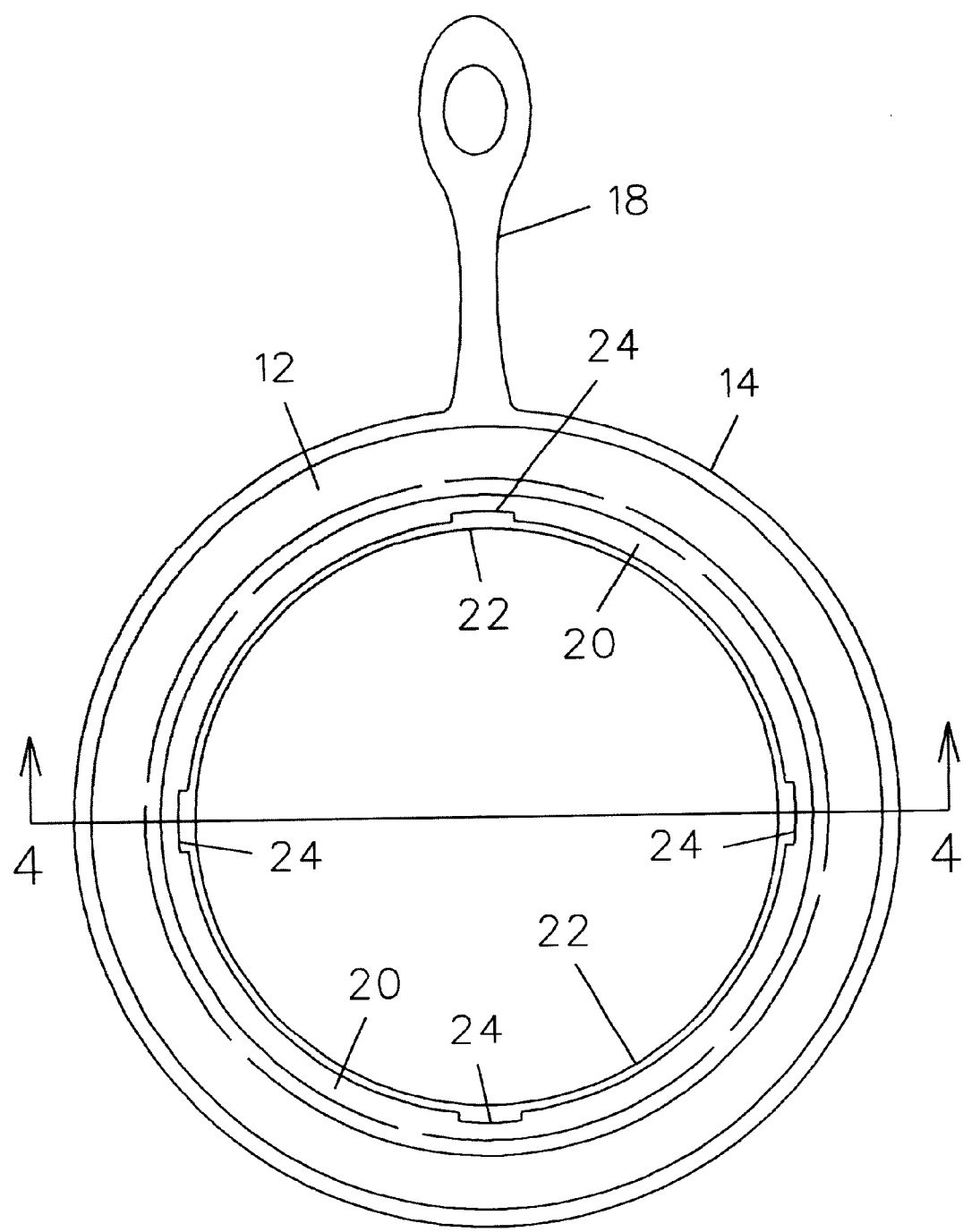
FIG. 3 is a top view of the skillet as in FIG. 2.
Figure 4:
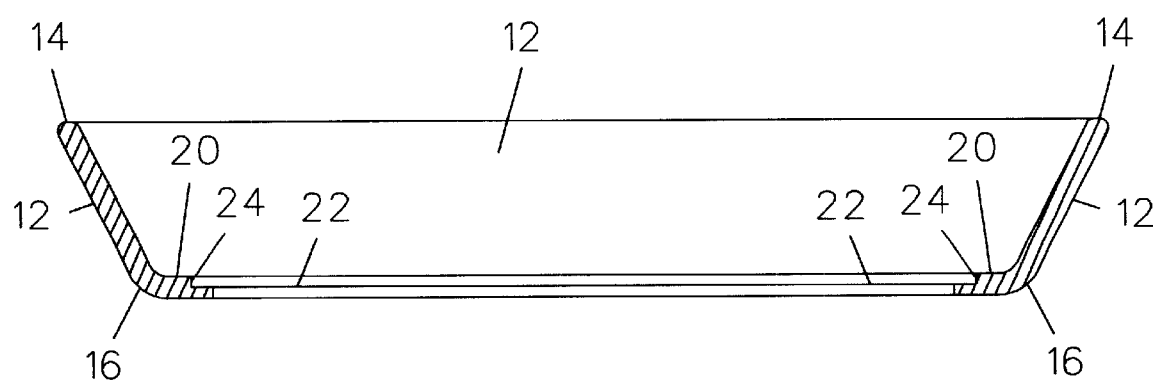
FIG. 4 is a sectional view of the skillet taken along line 4—4 of FIG. 3.

A skillet 10 having interchangeable perforated bottom plates according to the preferred embodiment of the present invention will now be described with reference to FIGS. 1 through 8 of the accompanying drawings. The skillet 10 includes a generally upstanding side wall 12 preferably formed in a circular pan-shaped configuration (FIG. 1) although a square or other configuration would also be suitable. The side wall 12 includes upper 14 and lower 16 edges. The side wall 12 is gently flared outwardly between the lower 16 and upper 14 edges. A rim 20 having an inwardly extending ledge portion 22 is fixedly attached to the lower edge 16 of the side wall 12 and extends along the entire extent thereof (FIG. 2). The rim 20 is generally perpendicular to the side wall 12 and extends a short distance inwardly relative thereto so as to define an open bottom of the skillet 10. The rim 20 defines a plurality of notches 24 spaced apart along a top surface thereof, each notch extending only partially through the rim 20 and being in communication with a top surface of the ledge portion 22 (FIG. 2). It is understood, however, that while a plurality of notches 24 is preferred, a single notch would be suitable, as to be further described later.

A handle 18 is fixedly attached to the upper edge 14 of the side wall 12 and extends outwardly therefrom. Obviously, the handle 18 may be fixedly attached at any point along the side wall 12 instead of the upper edge 14 and may even be integrally formed with the side wall 12. Preferably the entire skillet 10 is constructed of cast iron or another material that can withstand the intense heat of an open flame or cooking grill.

Figure 5:
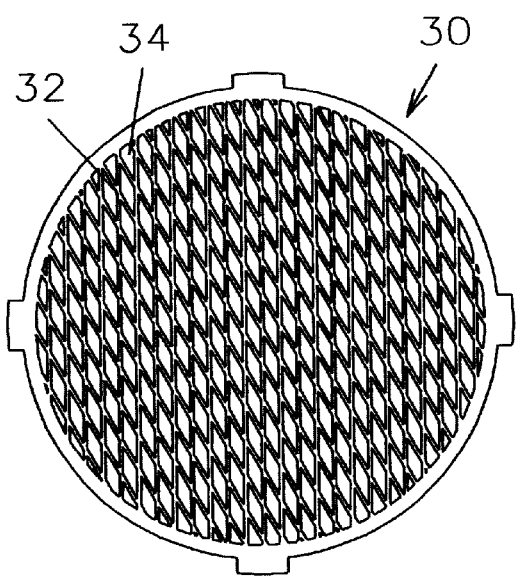
FIG. 5 is a top view of one interchangeable bottom plate.

The skillet 10 includes a plurality of bottom plates 26 with each plate being dimensioned to be supported atop the ledge portion 22 of the rim 20 and thus to cover the open bottom. More particularly, each plate 26 includes a generally circular configuration having a plurality of radially spaced apart tabs 28 extending from a peripheral edge thereof (FIG. 5). Of course, each plate 26 need only have the same number of tabs 28 as there are corresponding notches 24. Each tab 28 has a configuration complementary to a configuration of a notch 24 such that a bottom plate 26 may be selectively positioned upon the ledge portion 22 of the rim 20 with respective tabs 28 engaging respective notches 24 in a mating relationship. Therefore, a bottom plate 26 is supported by the ledge portion 22 with at least one tab 28 engaging a respective notch 24 (FIG. 1). The tab/notch configuration precludes radial or lateral movement of the plate 26 in the skillet 10 during cooking. Alternatively to the tab/notch embodiment, stop members (not shown) could be attached to the top surface of the ledge portion 22 for selectively capturing a tab to similarly inhibit plate rotation.

Preferably, the rim has a thickness of about one-quarter inch and the ledge portion 22 has a thickness smaller than that of the rim 20. Further, the distance from a top surface of the ledge portion 22 is equal to a thickness of a bottom plate 26 such that the tabs 28 of a plate 26 nest properly with respective notches 24 when the plate 26 is positioned upon the ledge portion 22.

Figure 6:
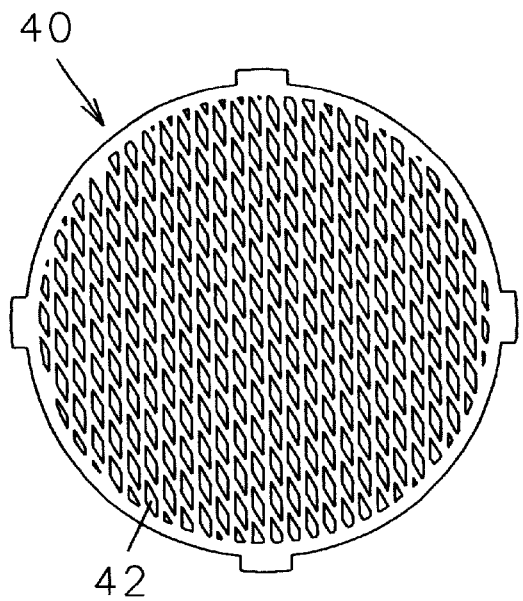
FIG. 6 is a top view of another interchangeable bottom plate.
Figure 7:
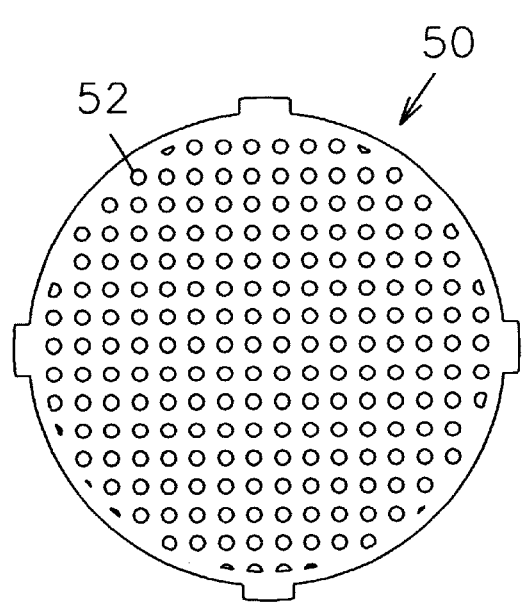
FIG. 7 is a top view of still another interchangeable bottom plate.
Figure 8:
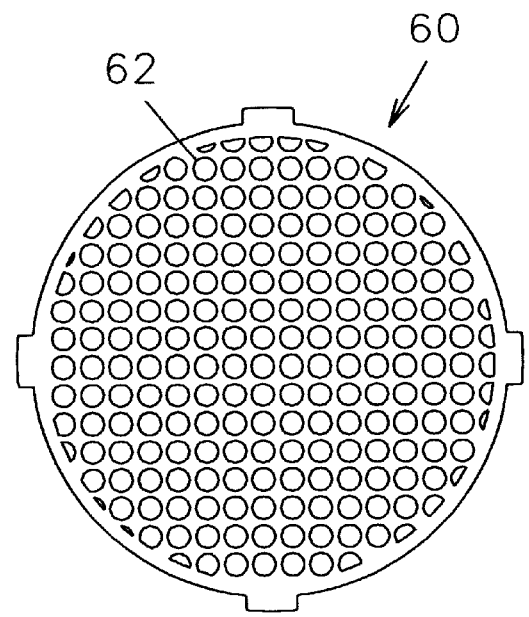
FIG. 8 is a top view of yet another interchangeable bottom plate.

Each one of the plurality of bottom plates 26 includes a respective cooking surface having a unique configuration of apertures particularly suited for cooking various sizes of food items. One particular bottom plate 30 is shown in FIG. 5 which includes a grate cooking surface 32 having diagonally overlapping grate elements that define a plurality of large diamond-shaped apertures 34. Another bottom plate 40 is shown in FIG. 6 that is substantially similar to the FIG. 5 bottom plate 30, but defines smaller diamond-shaped apertures 42. Still another bottom plate 50 is shown in FIG. 7 having a cooking surface defining a plurality of small circular apertures 52 arranged in parallel rows and columns. Yet another bottom plate 60 is shown in FIG. 8 that is substantially similar in construction to the FIG. 7 bottom plate 50 but defines apertures 62 having greater diameter. It is understood that additional plates having cooking surfaces of other configurations would also be suitable and the invention is not limited to those shown and described herein.

In use, a bottom plate is selected from the plurality of bottom plates 26 depending on the type or size of food items to be cooked over an open flame or a cooking grill. The selected bottom plate 26 may then be positioned atop the ledge portion 22 of the skillet 10 with corresponding tabs 28 and notches 24 being engaged to preclude plate rotation during cooking. As additional food items, possibly of a different size, are desired to be cooked, the present bottom plate may be removed and replaced with another bottom plate, such removal being done carefully or with a tool so as to avoid being burned by a hot plate.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. A skillet for use in cooking food items over a cooking grill, comprising:

a generally upstanding side wall defining a generally circular configuration and having upper and lower edges;

a ledge portion fixedly attached to said lower edge of said side wall and extending inwardly relative to said side wall, said ledge portion defining an open bottom;

a plurality of interchangeable bottom plates, each bottom plate being dimensioned to removably rest atop said ledge portion and having a cooking surface defining a plurality of apertures; and wherein a configuration of a respective cooking surface is different from a configuration of any other cooking surface.

2. The skillet as in claim 1 wherein said side wall includes an outwardly flared configuration between said lower and upper edges.

3. The skillet as in claim 1 further comprising a handle fixedly attached to said upper edge of said side wall and extending outwardly from said side wall.

4. The skillet as in claim 1 wherein:

said ledge portion defines at least one notch extending partially therethrough; and each bottom plate includes at least one tab attached to a peripheral edge thereof and having a configuration complementary to a configuration of said at least one notch, said at least one tab adapted to selectably mate with said at least one notch when a respective bottom plate is positioned atop said ledge portion so as to prohibit rotary movement of said respective bottom plate.

5. The skillet as in claim 1 wherein said cooking surface of a respective bottom plate includes a grate configuration having diagonally overlapping grate elements with respective apertures defining diamond-shaped configurations.

6. The skillet as in claim 1 wherein each aperture of said cooking surface of a respective bottom plate includes a circular configuration, said apertures of said respective bottom plate being evenly spaced apart and arranged in parallel rows and columns.

\* \* \* \* \*